United States Patent [19]
Oishi et al.

[11] 3,984,836
[45] Oct. 5, 1976

[54] RELATIVE DISTANCE INDICATING SPEEDOMETER FOR A VEHICLE

[75] Inventors: Kazuo Oishi, Oobu; Matatoyo Hinachi, Nagoya; Takeshi Matsui, Kariya; Masao Kotera, Okazaki, all of Japan

[73] Assignee: Nippon Soken, Inc., Nishio, Japan

[22] Filed: Dec. 27, 1974

[21] Appl. No.: 536,962

[30] Foreign Application Priority Data
Feb. 11, 1974   Japan.................. 49-16482

[52] U.S. Cl............... 343/13 R; 340/23; 340/32; 343/9
[51] Int. Cl.².......................... G01S 9/06
[58] Field of Search ........ 340/33, 34, 62, 23, 340/32; 343/7 VM, 9, 13 R

[56] References Cited
UNITED STATES PATENTS

| | | | |
|---|---|---|---|
| 2,851,120 | 9/1958 | Fogiel | 343/7 VM X |
| 3,377,587 | 4/1968 | Nakahara et al. | 343/7 VM |
| 3,824,592 | 7/1974 | Mehltretter | 343/7 VM X |
| 3,850,041 | 11/1974 | Seaman | 340/6 Z |

OTHER PUBLICATIONS
Shefer et al.; Harmonic Radar Helps Autos Avoid Collisions; IEEE Spectrum, May 1973; pp. 38–45.

*Primary Examiner*—T.H. Tubbesing
*Attorney, Agent, or Firm*—Cushman, Darby & Cushman

[57] ABSTRACT

There is provided a relative distance indicating speedometer for a vehicle comprising relative distance detecting means for measuring the relative distance of a vehicle carrying the speedometer with respect to an object such as the vehicle in front, and relative distance indicating means for indicating the measured relative distance in accordance with the output signal of the relative distance detecting means. The relative distance indicating means are arranged in the speedometer which indicates the speed of the vehicle, and therefore the apparatus of this invention is inexpensive to manufacture and simple in construction.

3 Claims, 1 Drawing Figure

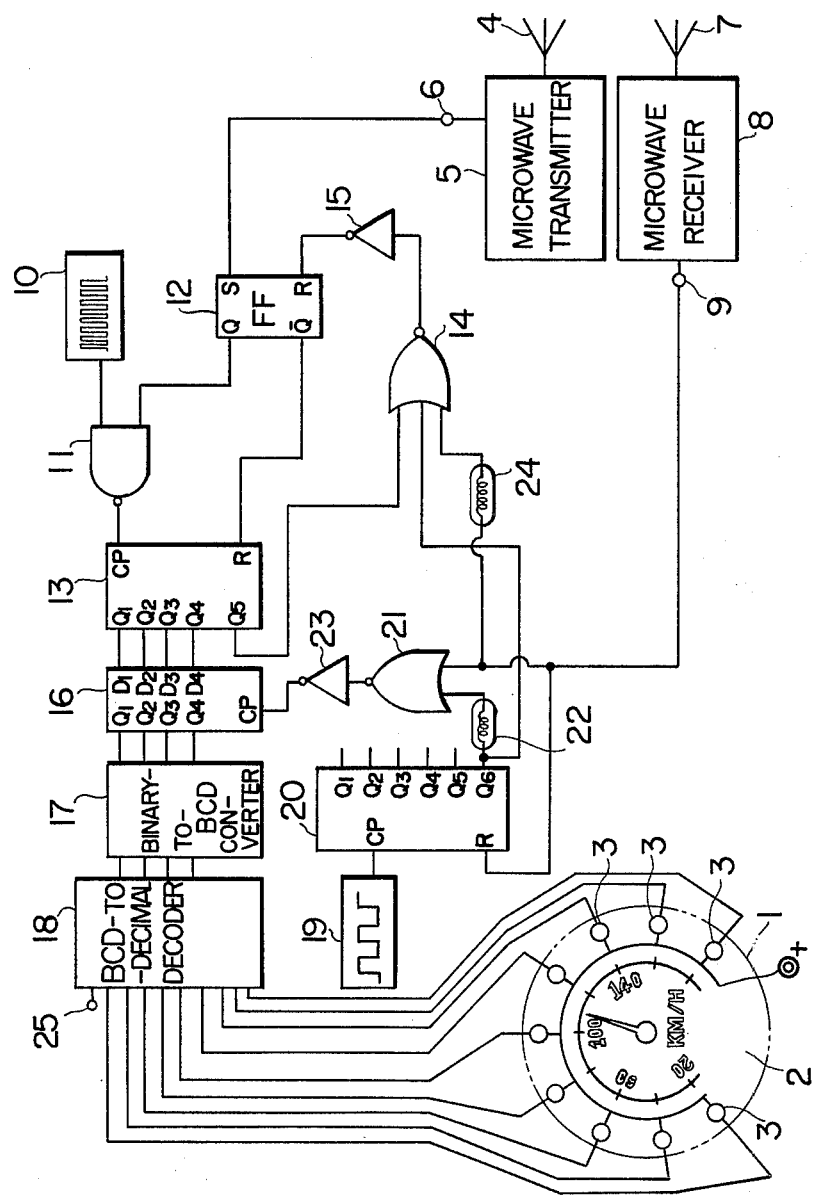

RELATIVE DISTANCE INDICATING SPEEDOMETER FOR A VEHICLE

BACKGROUND OF THE INVENTION

1. FIELD OF THE INVENTION

The present invention relates to a relative distance indicating speedometer for a vehicle for measuring the relative distance of a vehicle carrying the speedometer with respect to an object such as the vehicle in front and indicating the measured relative distance in the speedometer.

2. DESCRIPTION OF THE PRIOR ART

In the past, it has been the practice for the driver of a vehicle to visually perceive the relative distance of his vehicle with respect to an object which is in front thereof, so that whether or not his vehicle is running at the proper speed is judged and the vehicle speed is controlled accordingly. In this case, the perception of relative distance by the driver as well as his judgement whether the speed of his vehicle is proper or not are conventionally performed only with a low degree of reliability, and this is known to be a cause of accident such as rear-end collisions. In an attempt to prevent the occurrence of such accidents, a driving assistance system has been proposed which comprises a relative distance detector for measuring the relative distance of a vehicle with respect to the vehicle in front, a relative speed detector for detecting the relative speed of the vehicle with respect to the vehicle in front, a vehicle speed detector for detecting the speed of the vehicle itself, and a computing control unit for operating on the relative distance, relative speed and vehicle speed detected by the respective detectors and giving a warning and performing the required automatic control action. A disadvantage of this type of systems is that when the existence of any dangerous condition has been determined by the computing control unit, it gives a warning and performs the required automatic control operations all at once with the resulting danger of mentally disturbing the driver and thus causing him to misoperate the vehicle. Another disadvantage is that since any malfunction of the system itself has the danger of causing a very dangerous situation, the component parts of the respective detectors must have a very high degree of precision and moreover these component parts must be constantly checked and adjusted thus making the system very expensive to manufacture.

SUMMARY OF THE INVENTION

With a view to overcoming the foregoing difficulty, it is the object of the present invention to provide a relative distance indicating speedometer for a vehicle comprising relative distance detecting means for detecting the relative distance of a vehicle carrying the speedometer with respect to an object, and relative distance indicating means adapted for indicating the measured relative distance in accordance with the output signal of the relative distance detecting means and provided in the speedometer for indicating the speed of the vehicle itself, whereby the driver is permitted to control the speed of his vehicle in accordance with the measured relative distance by monitoring through the single meter both the relative distance of his vehicle with respect to an object, e.g., the vehicle in front and his vehicle's speed and without forcibly restricting the acceleration and deceleration functions of his vehicle, the occurrence of very serious situations which are likely to be caused by irregularities is prevented, and the apparatus is thus inexpensive to manufacture and simple in construction.

BRIEF DESCRIPTION OF THE DRAWING

The accompanying single figure drawing is a wiring diagram showing an embodiment of a relative distance including speedometer for a vehicle according to the present invention.

DESCRIPTION OF THE PREFERRED EMBODIMENT

A preferred embodiment of the relative distance indicating speedometer for a vehicle in accordance with the present invention will now be described with reference to the accompanying single figure drawing. In the drawing, numeral 1 designates a speedometer, 2 an instrument panel of the speedometer 1 having an indicating scale marked thereon, 3 a plurality of light emitting diodes arranged on the instrument panel 2 and each having its anode terminal connected to a positive voltage terminal thus forming relative distance indicating means. The speedometer 1 is provided in the driver's compartment to face the driver. Numeral 4 designates a transmitting antenna, 5 a microwave transmitter for radiating a microwave in a pulse like form into the air through the antenna 4 and generating a trigger pulse at a terminal 6 simultaneously with the radiation of the microwave, 7 a receiving antenna, 8 a microwave receiver for receiving the reflected wave of the radiated microwave and generating a trigger pulse at a terminal 9 simultaneously with the reception of the reflected microwave. Numeral 10 designates a clock pulse generator, 11 a NAND gate having its one input terminal connected to the clock pulse generator 10, 12 a flip-flop circuit (FF) having its set terminal S connected to the terminal 6 and its output terminal Q connected to the other input terminal of the NAND gate 11. The output terminal of the NAND gate 11 and the output terminal $\bar{Q}$ of the flip-flop circuit 12 are respectively connected to the clock pulse terminal CP and the reset terminal R of a binary counter 13, whereby the binary counter 13 generates a logical value "0" at its output terminals $Q_1, Q_2, Q_3, Q_4$ and $Q_5$ when an input logical value "1" is applied to the reset terminal R. Numeral 14 designates a NOR gate having its one input terminal connected to the output terminal $Q_5$ of the binary counter 13, 15 an inverter provided between the output terminal of the NOR gate 14 and the reset terminal R of the flip-flop circuit 12, 16 a latch circuit having its input terminals $D_1, D_2, D_3$ and $D_4$ respectively connected to the output terminals $Q_1, Q_2, Q_3$ and $Q_4$ of the binary counter 13. Numeral 17 designates a binary-to-BCD converter having its input terminals respectively connected to the output terminals $Q_1, Q_2, Q_3$ and $Q_4$ of the latch circuit 16 which converts a binary number to the corresponding binary coded decimal number and which consists of the Texas Instruments SN 74185 integrated circuit. The output terminals of the converter 17 are connected to the respective BCD input terminals of a BCD-to-decimal decoder 18 for decoding a binary coded decimal number of the corresponding decimal number, and the decimal output terminals of the decoder 18 are respectively connected to 125 cathode terminals of the associated light emitting diodes 3 constituting the relative distance indicating means.

In the described and illustrated embodiment, the decoder 18 consists of the Texas Instruments SN 7442 integrated circuit. Numeral 19 designates a clock pulse generator, 20 a binary counter having its clock pulse terminal CP connected to the output terminal of the clock pulse generator 19, its reset terminal R connected to the terminal 9 and its output terminal $Q_6$ connected to the second input terminal of the NOR gate 14, 21 a NOR gate having its one input terminal connected to the output terminal $Q_6$ of the binary counter 20 through a delay element 22 and the other input terminal connected to the terminal 9, 23 an inverter provided between the output terminal of the NOR gate 21 and the clock pulse terminal CP of the latch circuit 16, 24 a delay element provided between the terminal 9 and the third input terminal of the NOR gate 14.

With the construction described above, the relative distance indicating speedometer of this invention operates as follows. The microwave transmitter 5 radiates a microwave in pulse like form into the air at predetermined time intervals through the antenna 4, and at the same time it generates at the terminal 6 a trigger pulse having a small pulse width. This trigger pulse sets the flip-flop circuit 12, so that an output logical value "1" is generated at its output terminal Q and the clock pulses from the clock pulse generator 10 are transferred to the clock pulse terminal of the binary counter 13 causing it to start counting the number of the clock pulses. The count of the binary counter 13 is transferred in a binary number to the input terminals of the latch circuit 16. On the other hand, part of the microwave radiated from the transmitting antenna 4 is reflected from an object, e.g., the vehicle in front and it arrives at the receiving antenna 7 at a time delayed from the radiation time of the microwave through the transmitting antenna 4 by an amount corresponding to the distance of the vehicle from the object, and the reflected microwave is detected by the microwave receiver 8 which in turn generates a trigger pulse at the terminal 9 simultaneously with the reception of the reflected microwave. The trigger pulse generated at the terminal 9 resets the binary counter 20, and it is also applied to the clock pulse terminal CP of the latch circuit 16 through the NOR gate 21 and the inverter 23, so that the count of the binary counter 13 existing at the time of receiving the reflected microwave is stored at the output terminals $Q_1$, $Q_2$, $Q_3$ and $Q_4$ of the latch circuit 16. The trigger pulse generated at the terminal 9 is also transferred to the NOR gate 14 through the delay element 24 after which the trigger pulse resets the flip-flop circuit 12 through the inverter 15. Consequently, the flip-flop circuit 12 generates an output logical value "1" at its output terminal Q and the binary counter 13 is reset. Thus, the NAND gate 11 no longer passes the clock pulses from the clock pulse generator 10 to the clock pulse terminal CP of the binary counter 13.

The binary count stored at the output terminals of the latch circuit 16 is converted into a binary coded decimal number by the binary-to-BCD converter 17, and it is then converted by the decoder 18 to a decimal number which is in turn delivered to its output terminal as the decimal count. In other words, when the voltage goes to a low level at the output terminal of the decoder 18 which corresponds to the binary count stored at the output terminals of the latch circuit 16, one of the plurality of light emitting diodes 3 connected to respond to the output terminal of the decoder 18 which has gone to the low level emits light and indicates the measured relative distance on the speedometer 1.

On the other hand, when the relative distance increases so that it is no longer necessary to control the speed of the vehicle carrying the apparatus, in advance of the time that a trigger pulse is generated at the terminal 9, the number of the pulses counted by the binary counter 13 increases to such an extent that the voltage at the output terminal $Q_5$ of the binary counter 13 goes to a high level (the $Q_5$ output logical value is "1") and an input logical value "1" is applied to the reset terminal of the flip-flop circuit 12 through the NOR gate 14 and the inverter 15. Consequently, the flip-flop circuit 12 is first reset and then the binary counter 13 is reset thereby to generate a logical value "0" at each of the output terminals $Q_1$, $Q_2$, $Q_3$, $Q_4$ and $Q_5$ of the binary counter 13. After the binary counter 13 has been reset, since the logical values that can be stored at the respective output terminals of the latch circuit 16 are "0", "0", "0" and "0", only a zero decimal output terminal 25 of the decoder 18 which is not connected to any light emitting diode 3 goes to a low level in response to the generation of the trigger pulse at the terminal 9 and none of the light emitting diodes 3 generate light.

On the other hand, after the output logical value has gone to the "1" at the output terminal $Q_5$ of the binary counter 13 resetting all its output logical values to the "0" in the manner described above, if there is no generation of any trigger pulse at the terminal 9 for a predetermined period of time consecutively due to the absence of any object in front of the vehicle, the output logical value goes to the "1" at the output terminal $Q_6$ of the binary counter 20 which has been counting the clock pulses from the clock pulse generator 19 from the moment that the last trigger pulse was generated at the terminal 9. Consequently, the flip-flop circuit 12 is first reset through the NOR gate 14 and the inverter 15 and then the output terminals of the binary counter 13 are reset to the output logical values "0", "0", "0" and "0". Then, at the expiration of a predetermined time depending on the delay element 22, a rising pulse is transferred to the clock pulse terminal CP of the latch circuit 16 through the NOR gate 21 and the inverter 21, and the latch circuit 16 stores the logical values "0", "0", "0" and "0" of the output terminals $Q_1$, $Q_2$, $Q_3$ and $Q_4$ of the binary counter 13. When this occurs, only the zero decimal output terminal 25 of the decoder 18 which is not connected to any light emitting diode 3 goes to the low level and all of the remaining decimal output terminals go to the high level. Consequently, all of the light emitting diodes 3 terminate their generation of light. In this way, when the vehicle approaches an object such as the vehicle in front thus requiring the driver to control the speed of his vehicle, the relative distance is indicated on the speedometer, whereas no indication is made on the speedometer when there is no need to control the vehicle speed. On the other hand, if there is a fault in the relative distance detecting means, indicating means, etc., no relative distance will be indicated on the speedometer even when the vehicle is approaching an object. Accordingly, the driver can control the speed of his vehicle by watching the speedometer, and the driver can also find the presence of any fault in the speedometer.

Further, the arrangement of indicating means may be changed as described in accordance with the shape of a speedometer used, and what is required is to arrange the indicating means in such a manner that the measured relative distance is indicated in the vicinity of the corresponding speed graduation on the speedometer scale plate. In this way, the driver can readily perceive the relationship between the relative speed and the speed of his vehicle.

It will thus be seen from the foregoing description that since the vehicle relative speed indicating speedometer according to the invention comprises relative distance detecting means for detecting the relative distance of a vehicle carrying the apparatus with respect to the vehicle in front, and relative distance indicating means arranged to indicate the measured relative distance in accordance with the output signal of the relative distance detecting means and provided in the speedometer which indicates the speed of the vehicle, there is a great advantage that the driver can perceive both the relative distance and the speed of his vehicle by simply watching the speedometer, and the vehicle speed can be controlled as desired by the driver's own will and without resorting to any forced control of the vehicle speed. There is another great advantage that the apparatus is simple in construction due to the absence of relative speed detecting means, computing control means, etc., and moreover the driver will not be affected by the occurrence of any fault in the apparatus thus preventing the driver from being exposed to danger.

What is claimed is:

1. A relative distance indicating speedometer comprising:
   an instrument panel having a speed indicating scale marked thereon;
   a plurality of display means arranged along said indicating scale;
   a relative distance detecting means for measuring a distance between a subject vehicle and a front object to produce an electric signal in response to the measured relative distance; and
   means connected between said display means and said relative distance detecting means for preventing lighting of said display means when said relative distance is less than a predetermined value for lighting said display means in correspondence with said electric signal when said relative distance is more than said predetermined value.

2. A relative distance indicating speedometer as defined in claim 1, wherein said relative distance detecting means comprises:
   a microwave transmitting and receiving means;
   a clock generator for producing clock pulses of a constant frequency; and
   a counter for counting said clock pulses during a time from transmission of microwave to receiving thereof.

3. A relative distance indicating speedometer as defined in claim 2, further comprising:
   means for resetting said counter when a relative distance is more than said predetermined value not to light said display means.

* * * * *